US005187596A

United States Patent [19]
Hwang

[11] Patent Number: 5,187,596
[45] Date of Patent: Feb. 16, 1993

[54] CONTACT IMAGE SENSOR

[75] Inventor: Hag-In Hwang, Euiwang, Rep. of Korea

[73] Assignee: Samsung Electronics Co., Ltd., Suwon, Rep. of Korea

[21] Appl. No.: 545,867

[22] Filed: Jun. 29, 1990

[30] Foreign Application Priority Data

Nov. 24, 1989 [KR] Rep. of Korea ............... 1989-17151

[51] Int. Cl.$^5$ .............................................. H04N 1/04
[52] U.S. Cl. .................................... 358/484; 358/482; 358/483; 250/208.1
[58] Field of Search ...................... 358/484, 482, 483; 250/208.1; 350/96.27

[56] References Cited

U.S. PATENT DOCUMENTS

| | | | |
|---|---|---|---|
| 4,408,230 | 10/1983 | Tamura et al. | 358/482 |
| 4,680,644 | 7/1987 | Shirato et al. | 250/208.1 |
| 4,737,653 | 4/1988 | Nakagawa et al. | 358/482 |
| 4,818,861 | 4/1989 | Horiuchi et al. | 358/208 |
| 4,874,957 | 10/1989 | Sasaki et al. | 250/208.1 |
| 4,942,481 | 7/1990 | Yoshinouchi et al. | 358/484 |
| 4,959,533 | 9/1990 | Yamazaki et al. | 250/208.1 |
| 4,970,607 | 11/1990 | Itagaki et al. | 250/208.1 |
| 5,004,905 | 4/1991 | Yoshinouchi et al. | 250/208.1 |
| 5,032,718 | 7/1991 | Murakami | 250/208.1 |
| 5,038,027 | 8/1991 | Ioka | 250/208.1 |

Primary Examiner—Stephen Brinich
Assistant Examiner—Thomas L. Stoll
Attorney, Agent, or Firm—Robert E. Bushnell

[57] ABSTRACT

A contact image sensor miniaturized by using an optical fiber array glass plate as an image focus lens and by forming a photoelectric conversion part and a light emitting part on one surface of the optical fiber array glass plate at the same time, is disclosed. The contact image sense includes: a protective plate having an opening; an optical fiber array glass plate having a plurality of optical fiber arrays disposed vertically through the opening upper and lower surfaces of the optical fiber arrays being polished optically; a photoelectric conversion means which is composed of a photo sense, for converting a incident light into a electrical signal; a detection circuit which converts the electrical signal into a digital signal; a light emitting element which can make a light incident upon a surface of a paper which is placed on a optical fiber of the optical fiber array glass plate; an optical reflection mirror, being placed on the optical fiber array of the optical fiber array glass plate, for reflecting a light emitted from the light emitting element to the surface of the paper.

7 Claims, 3 Drawing Sheets

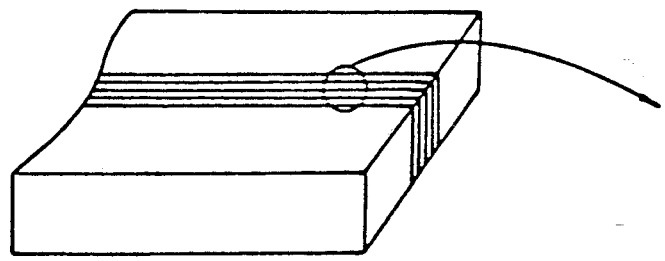
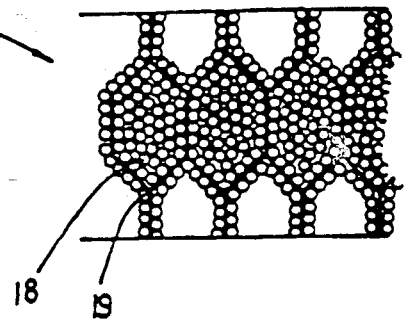
F I G. 5A      F I G. 5B
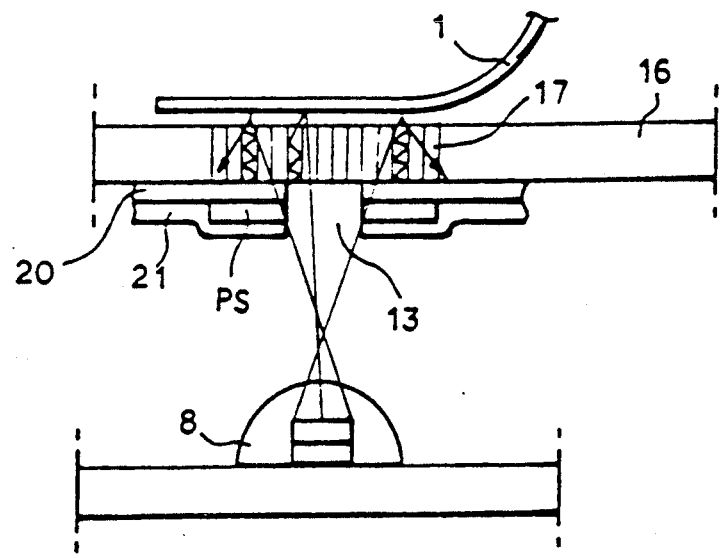
F I G. 6

CONTACT IMAGE SENSOR

BACKGROUND OF THE INVENTION

The present invention relates to a contact image sensor which uses an optical fiber array glass plate.

Contact image sensors are widely used in an image detection part of a facsimile and the like for reading the image of a paper. In general, such a contact image sensor as stated above must be equipped with a photoelectric conversion array, a detection circuit array and a light emitting diode (hereinafter referred to as LED) array, being formed of a structure in which one line of a paper is scanned under electrical control.

FIG. 1 is a cross-sectional view of a conventional contact image sensor equipped with a self focus micro lens array. A photoelectric conversion part 4 and a detection circuit 5 are formed on the insulating substrate 6 installed in the part of a protective plate 7, and a light emitting part 8 is attached to an inclined plane of the protective plate 7 and a self focus micro lens 3 is positioned vertically over the photoelectric conversion part 4 in the protective plate 7. An upper surface of a wear-resistant glass plate 2 is made to be positioned on the focal distance of the self focus micro lens 3, and a surface of the paper 1 is arranged to come into contact with the upper surface of the wear-resistant glass plate 2.

The photoelectric conversion part 4 converts a incident light into an electrical signal. Usually, the photoelectric conversion part 4 is composed of a photocell and a photodiode. The detection circuit 5 converts the output from the photoelectric conversion part 4 into a digital value.

The light which is irradiated from the light emitting part 8 to the direction of the paper permeates the transparent wear-resistant glass plate 2 and reaches the surface of the paper 1. The light reflected from the surface of the paper 1 is condensed in the photoelectric conversion part 4 through the self focus micro lens 3. The light condensed by the self focus micro lens 3 is converted into an electrical signal by the photoelectric conversion part 4. The detection circuit 5 converts the electrical signal into a digital signal, which is outputted to the outside. Here, the self focus micro lens 3 has a refractive index distribution like a formula (1) given below.

$$n(r) = n_0 \left( 1 - \frac{A}{2} r^2 \right) \quad (1)$$

The light incident upon the self focus micro lens 3 propagates forming a meandering curve according to the refractive index distribution like the formula (1), and the light incident is condensed to the photoelectric conversion part 4.

In the above formula (1), $n(r)$ is the refractive index distribution in the direction of the radius of the self focus micro lens, $n_0$ is a refractive index on the central axis of the self focus micro lens, A is the distribution constant of a refractive index and r is a distance in the direction of radius from the center.

However, such a contact image sensor as formed like FIG. 1 must use a self focus micro lens. According to the technical data CAT SLA Vol. 3 (October, 1987) published into Japanese, the optical dimension of practical self focus micro lens on the basis of the self focusing conditions used in a facsimile must represent that a view angle used in a facsimile is 20° and that the length $z_0$ of lens whose a distance between the paper and the lens is 17-18mm is about 8mm, as shown in FIG. 2. Thus, it is difficult to miniaturize the contact image sensor to be formed as shown in FIG. 1. Moreover, the self focus micro lens 3 is complicated in manufacturing process because the lens has a particular refractive index distribution. It also involves a problem in that the lens is a very expensive one among the constituent parts of the sensor.

FIG. 3 is a cross-sectional view of another conventional contact image sensor. A photoelectric conversion part 4 with an opening 13 formed in its center for passage of light is formed of thin film on the transparent glass plate 12 and the circumference of the opening 13 is so made as not to pass the rays of light by covering the lower part of photoelectric conversion part 4 with a thin metallic film made up of a metallic conduction layer. The upper part of photoelectric conversion part 4 manufactured in such a manner is coated with transparent resin and a wear-resistant protective glass plate 10 is stuck thereto. The light emitting part 8 is attached to the protective plate 7 positioned in the lower part of transparent glass plate 12 and is formed to irradiate rays of light. The paper 1 is in contact with the upper surface of wear-resistant protective glass plate 10.

Referring to an operations of the contact image sensor formed like the FIG. 3, it is as follows. The light irradiated from the light emitting part 8 within the protective plate 7 permeates the transparent glass plate 12, passes through the opening 13 of the photoelectric conversion part 4 and permeates the transparent resin 11 and the wear-resistant protective glass plate 10 and reaches the paper 1. The light reflected from the paper 1 is made incident upon the photoelectric conversion part by permeating again the wear-resistant protective glass plate 10 and the transparent resin 11. At this time, the photoelectric conversion part 4 converts the quantity of incident light which is reflected from the paper 1 into an electrical signal and inputs the electrical signal to the detection circuit 5. The detection circuit 5 digitalizes the inputted signal and outputs the digitalized signal to the outside.

In the case where it is formed as shown FIG. 3, the self focus micro lens 3 is not used as a image focus lens, but the transparent resin 11 and the wear-resistant protective glass plate 10 are used in the upper of the photoelectric conversion part 4. However, the light reflected from the surface of paper 1 is weakened and dispersed while passing through the wear-resistant protective glass plate 10 and the transparent resin 11 and so a light route must be minimized by thinning the thickness of photoelectric conversion part 4. Thus, it is difficult to assemble a contact image sensor. When a resolving power rises, it is difficult to resolve an image and the output characteristic of the sensor tends to be thereby weakened. In the case where the wear-resistant protective glass plate 10 is scratched, the function of the sensor deteriorates.

SUMMARY OF THE INVENTION

An object of the present invention is to provide a contact image sensor miniaturized by using an optical fiber array glass plate as an image focus lens and by forming a photoelectric conversion part and a light emitting part on one surface of the optical fiber array glass plate at the same time.

To achieve the above object and other advantages of the invention, a contact image sensor according to the invention has: a protective plate, having an opening at an upper most portion of the plate, for protecting the contact image sensor; a glass plate having a plurality of optical fiber arrays disposed vertically through the opening, upper and lower surfaces of the optical fiber arrays being polished optically; a photoelectric conversion unit, located beneath the lower surface of the optical fiber array of the glass plate, for converting an incident light into an electrical signal; a detection unit, operably coupled to the photoelectric conversion unit, for detecting the electrical signal; a light emitting unit, located under the optical fiber array and within the protective plate, for making a light incident upon the optical fiber arrays.

BRIEF DESCRIPTION OF THE DRAWINGS

For a better understanding of the invention and to show how the same may be carried into effect, reference will now be made, by way of example, to the accompanying diagrammatic drawings, in which:

FIG. 5A is a perspective view of an optical fiber array glass plate shown in FIG. 4;

FIG. 5B is a partially enlarged view of the optical fiber array glass plate shown in FIG. 5A;

FIG. 6 shows a detailed structure and therein an irradiation condition of photoelectric conversion part shown in FIG. 4.

DETAILED DESCRIPTION OF THE INVENTION

Figure 1:
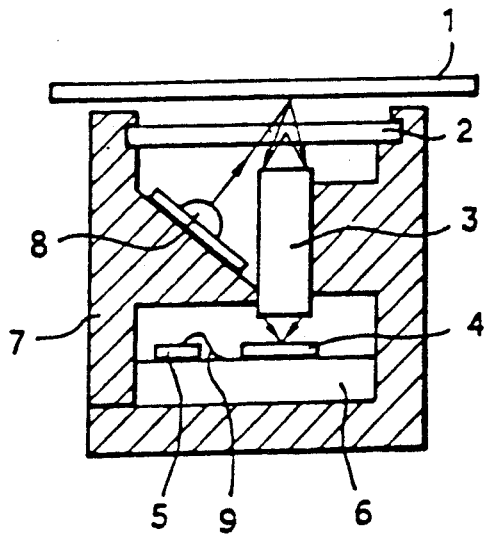
FIG. 1 is a cross-sectional view of a conventional contact image sensor provided with a self focus micro lens.
Figure 2:
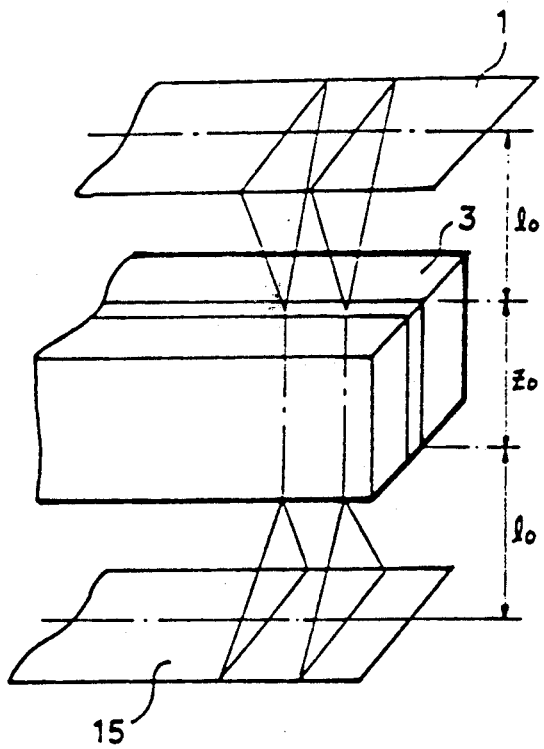
FIG. 2 is a schematic view for explaining an optical dimension condition of the self focus micro lens shown in FIG. 1.
Figure 3:
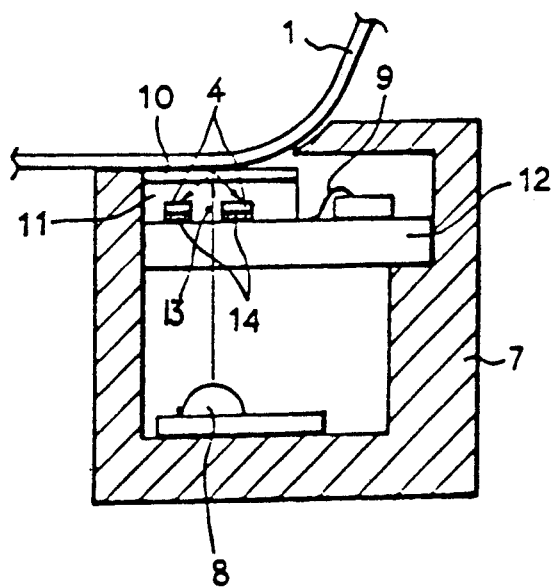
FIG. 3 is a cross-sectional view of another conventional contact image sensor.
Figure 4:
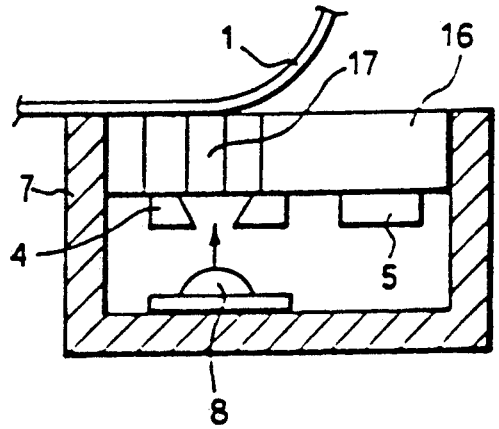
FIG. 4 is a cross-sectional view of a preferred embodiment of a contact image sensor according to the present invention.

FIG. 4 is a cross-sectional view of the contact image sensor according to the present invention, wherein a photoelectric conversion part 4 is formed on the lower surface of the optical fiber array 17 of optical fiber array glass plate 16(hereinafter referred to as OPTAP) both sides of which are optically ground, and a detection circuit 5 is formed on the same plane where the photoelectric conversion part 4 is formed, and a light emitting part 8 is installed in the vertical lower part of the optical fiber array 17 of the OPTAP 16, and all these parts are formed within a protective plate 7.

FIG. 5A and 5B are view detailed views explaining structures of the OPTAP 17 and a optical fiber 18, wherein the width of optical fiber array 17 is about 10-80μm and the optical fiber array 17 is formed by a group of optical fibers which are 10μm in diameter. This group of optical fibers are closely-packed and arranged in hexagonal bundles for the purpose of providing superior focused light and minimizing loss of light transmission. The reference number 19 is a resin or a molten glass layer.

FIG. 6 is a partially enlarged view of the contact image sensor shown in FIG. 4, wherein the photoelectric conversion part 4 formed by a thin film process under the optical fiber array 17 of OPTAP 16 is consisted of a transparent first conduction layer 20 in the lower surface of the optical fiber array 17 and, in the lower surface of the first conduction layer 20, a photo-sensor PS and a second conduction layer 21 are formed and, in the center of photoelectric conversion part 4 formed as above mentioned, an opening 13 is formed so as to pass the light of light emitting part 8. The photoelectric conversion part 4 can be formed by a thin film process or by a multi-chip bonding method under the optical fiber array 17. An indium tin oxide ITO can be used for the first conduction layer 20 and aluminum Al for the second conduction layer 21.

An operation process of FIG. 4 will be described by referring to FIG. 5A, 5B and 6. When a light is emitted from the light emitting part 8, the light irradiated in the light emitting part 8 is made incident upon the optical fiber array 17 of OPTAP 16 through the opening 13, and a light which deviates from the sphere of the opening 13 is reflected by the second conduction layer 21. Accordingly, the light irradiated from the light emitting part 8 is not incident directly upon the photo-sensor PS but upon the surface of paper 1 through the opening 13, and only the light reflected from the paper 1 is made incident upon the photo-sense PS through the first conduction layer 20.

That is, the light irradiated from the light emitting part 8 passes through the opening 13 only and permeates optical fibers 18 of the optical fiber array 17 and then the light is reached to the surface of paper 1 and reflected to the first conduction layer. The light reflected as above mentioned is condensed by optical fiber 18 of optical fiber array 17, and the condensed light permeates the first conduction layer 20 is made incident upon the photo-sense PS of the the photoelectric conversion part 4. At this time, the photo-sense PS converts the quantity of incident light into an electrical signal and inputs the electrical signal to the detection circuit 5 formed by a thin film process on the same surface of the OPTAP 16. The detection circuit 5 converts into a digital signal the image of paper 1 converted into an electrical signal and outputs the digital signal.

Therefore, the contact image sensor formed as shown in FIG. 4 irradiates the image of paper 1 by passing the light irradiated in the light emitting part 8 installed closely to the lower part of the OPTAP 16 through the optical fiber array 17 of the OPTAP 16, and the light irradiated to the paper 1 reaches the photoelectric conversion part 4 by being condensed through the optical fiber array 17 for the effective performance of photoelectric conversion. On the other hand, the function of an image sensor can be improved by forming the detection circuit 5 on the same plane as the photoelectric conversion part 4 by a thin film process and a contact image sensor can thereby be manufactured to a minimized thickness.

Figure 7:
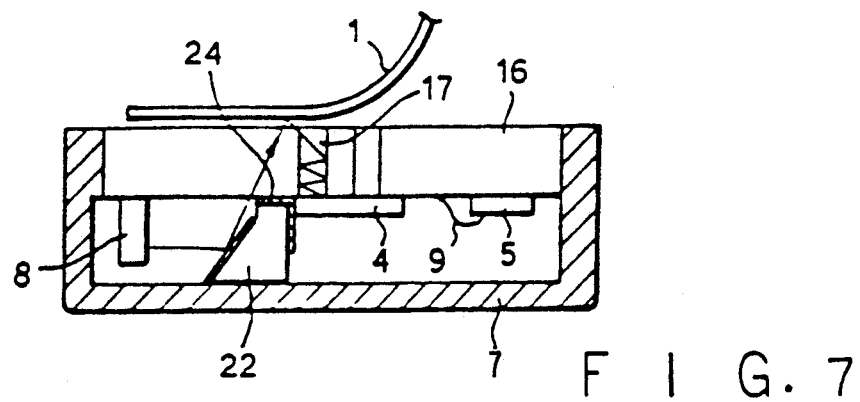
FIG. 7, 8 and 9 are cross-sectional views of other embodiments of a contact image sensor according to the present invention.

FIG. 7 is a cross-sectional view of another contact image sensor according to the present invention, wherein a photoelectric conversion part 4 is formed of a thin film in the lower surface of the optical fiber array 17 of the OPTAP 16 which can be positioned with both sides optically processed in the open part of a protective plate 7, and a light emitting part 8 and a detection circuit 5 are formed on the left and right of the plane where the photoelectric conversion part 4 is formed of a thin film, and an optical reflection mirror 22 is installed in the fixed position of the lower surface of said protective plate 7 in order to reflect at the fixed angle the light emitted from the side of said light emitting part 8 to the surface of paper 1 which will be positioned on the OPTAP 16.

The light emitting part 8 in the framework of FIG. 7 is an edge emitted light emitting diode formed by being die bonded and wire bonded directly to the OPTAP 16. The protective plate 7 is formed of a metal like aluminum or a black resin. When the light emitting part 8 shown in FIG. 7 emits a light, the light is reflected to the surface of paper 1 by the optical reflection mirror 22. The light emitted from the light emitting part 8 can permeate the OPTAP 16 and irradiate the surface of paper 1 by the angular adjustment of the optical reflection mirror 22. The light reflected from the surface of paper 1 is condensed to the optical fiber 18 of the optical fiber array 7 of the OPTAP 16. The light condensed to the optical fiber 18 is converted into a electrical signal by being incident upon the photoelectric conversion part 4 and inputted to the detection circuit 5 formed in the flank of the photoelectric conversion part 4. The detection circuit 5 converts the signal outputted from the photoelectric conversion part 4 into a digital signal and output to the outside.

Figure 8:
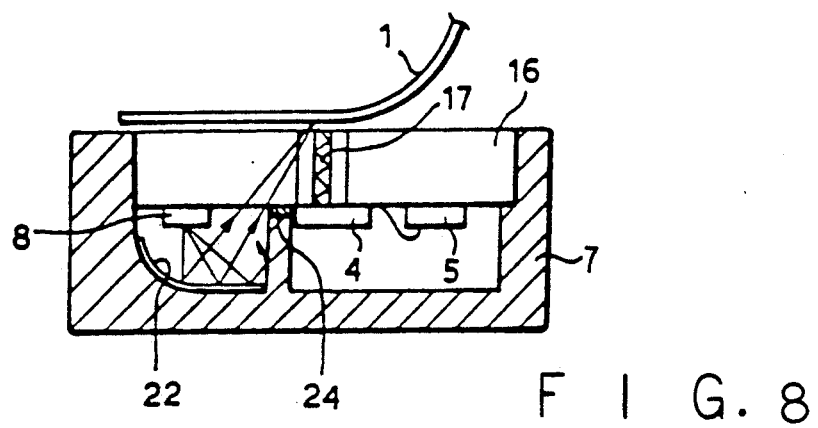

FIG. 8 is another improved embodiment of the protective plate 7 and the optical refection mirror 22 which is shown in FIG. 7. FIG. 8 is a structure which is formed of a photoelectric conversion part 4, a light emitting part 8 and a detection circuit 5 in the lower surface of the OPTAP 16 as shown in FIG. 7. An optical reflection mirror 22 is formed by coating a part of metallic or black resinous protective plate 7 with silver Ag and aluminum Al. In addition, a light-shielding bonded part 24 is formed by bonding the central part of protective plate 7 to the OPTAP 16 so that prevent the light irradiated in the light emitting part 8 is made incident upon the photoelectric conversion part 4 directly. The light emitting part 8 is formed by die bonding and wire bonding the flatted emitting diode to the OPTAP. The light emitted from the light emitting part 8 is reflected in the optical reflection mirror 22 and permeates the OPTAP 16 and reaches the surface of paper 1 and reflects therefrom. The light condensed permeates the optical fiber array 17, converted into a electrical signal and output by the detection circuit 5 to the outside.

Figure 9:
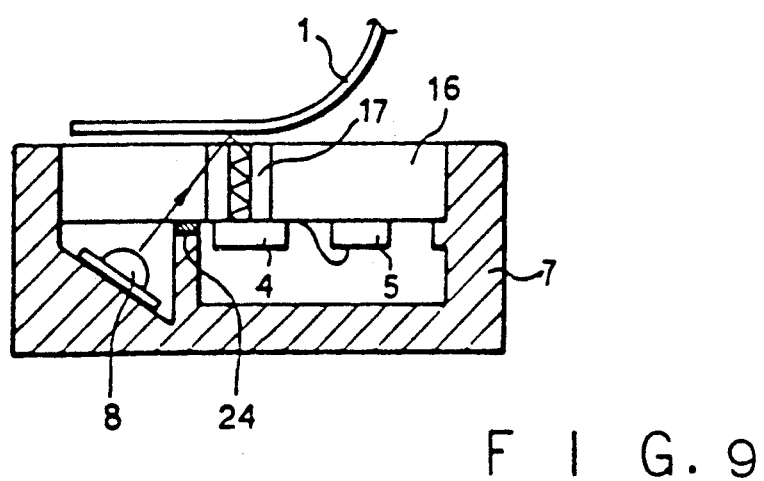

FIG. 9 is a further embodiment of the contact image sensor according to the present invention, wherein a photoelectric conversion part 4 is formed in the lower surface of the OPTAP 16, and the light emitting part 8 is positioned to be inclined on a protective plate 7 and, a light-shielding junction part 24 is formed by bonding the central part of the protective plate 7 to the OPTAP 16 so that prevent the light irradiated from the light emitting part 8 being incident directly upon the photoelectric conversion part 4. The light irradiated from the light emitting part 8 permeates the OPTAP 16 and reaches the surface of paper 1, and then the light is reflected from the paper 1 and condensed while permeates the optical fiber array 17, and the condensed light reaches the photoelectric conversion part 4. Thereafter, the reached light is converted into an electrical signal and outputted through the detection circuit 5 to the outside.

As described heretofore, the present invention does not use an expensive self focus micro lens which has been used in the conventional contact image sensor but forms a photoelectric conversion part, a detection circuit and a light emitting part on the same surface by using an optical fiber array plate. Consequently, the present invention can make a sensor smallish, inexpensive and highly functional. Moreover, the present invention can extend life of the sensor by causing no damage to the photoelectric conversion part because a paper moves on the opposite of the surface which is the sense formed under the photoelectric conversion part that is of the surface of the optical fiber array glass plate.

What is claimed is:

1. A contact image sensor, comprising:
   a protective plate for housing said contact image sensor;
   a glass plate having a plurality of optical fiber arrays disposed vertically within said glass plate for receiving an incident light, said plurality of optical fiber array having upper and lower surfaces being polished optically;
   light emitting means located proximate said lower surface of said glass plate and within said protective plate, for providing said incident light upon said plurality of optical fiber arrays;
   photoelectric conversion means formed on said lower surface of said plurality of optical fiber arrays by a thin film process, for converting said incident light into an electrical signal; said photoelectric conversion means comprising:
      a first conduction layer formed around a central area of said lower surface of said plurality of optical fiber arrays, for transmitting said incident light directed from an upper surface of said glass plate,
      a second conduction layer formed on a surface of said first conduction layer, for reflecting said incident light emitted from said light emitting means,
      a photo-sensor formed between said first conduction layer and said second conduction layer, for converting said incident light received through said first conduction layer, and
      an opening formed in a central area of said first conduction layer, said photosensor and said second conduction layer, for permitting said incident light emitted from said light emitting means incident upon said plurality of optical fiber arrays; and
   detection means coupled to said photoelectric conversion means, for detecting said electrical signal.

2. The contact image sensor according to claim 1, wherein said photoelectric conversion means is formed by a thin film process.

3. The contact image sensor according to claim 1, wherein said first conduction layer is transparent.

4. The contact image sensor according to claim 1, wherein said detection
   means is located proximate said first side of said glass plate.

5. A contact image sensor, comprising:
   a transparent substrate having a plurality of optical fiber arrays disposed vertically within said transparent substrate for receiving and transmitting incident light, each optical fiber array comprising closely-packed optical fibers forming hexagonal bundles;
   photoelectric conversion means formed on a surface of said plurality of optical fiber arrays for receiving the transmitted incident light from said transparent substrate to provide electrical signals in dependence upon said transmitted incident light, said photoelectric conversion means comprises:

a first conduction layer formed around a central area of said surface of said plurality of optical fiber arrays for transmitting said transmitted incident light;

a second conduction layer formed on a surface of said first conduction layer for reflecting said transmitted incident light;

photo-sensors formed between said first conduction layer and said second conduction layer for converting said transmitted incident light into said electrical signals; and light emitting means for emitting light through said central area of said surface of said plurality of optical fiber arrays to an information medium for sensing data in said information medium to provide said incident light representative of the sensed data from said information medium to said transparent substrate.

6. A contact image sensor according to claim 5, wherein said transparent substrate having a width approximately from 10 micrometers to 80 micrometers.

7. A contact image sensor according to claim 5, further comprising detector means for detecting said electrical signals and housing means for housing said contact image sensor.

* * * * *